Oct. 26, 1943.    R. A. FRANZEN    2,332,510
CUTTER GRINDER
Filed May 28, 1940    3 Sheets-Sheet 2
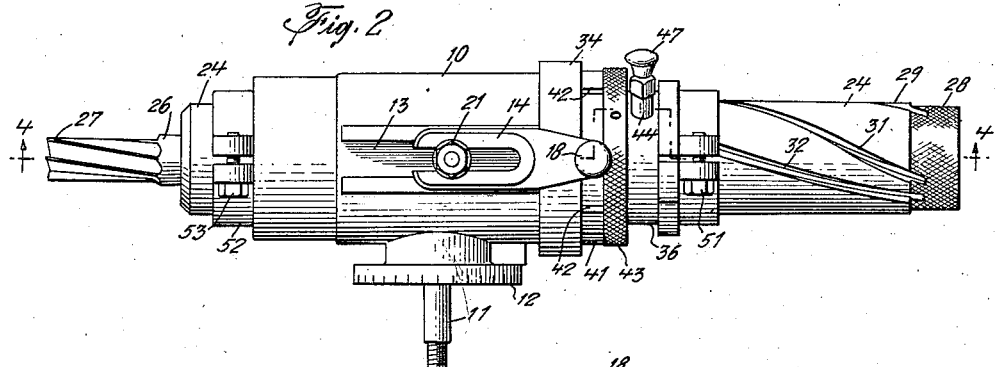
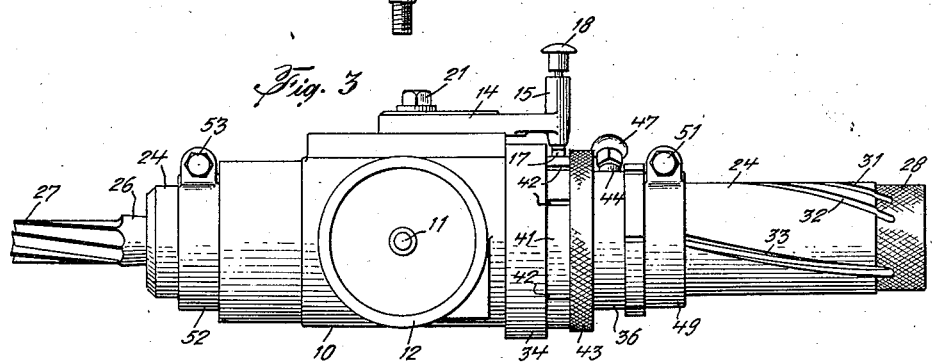
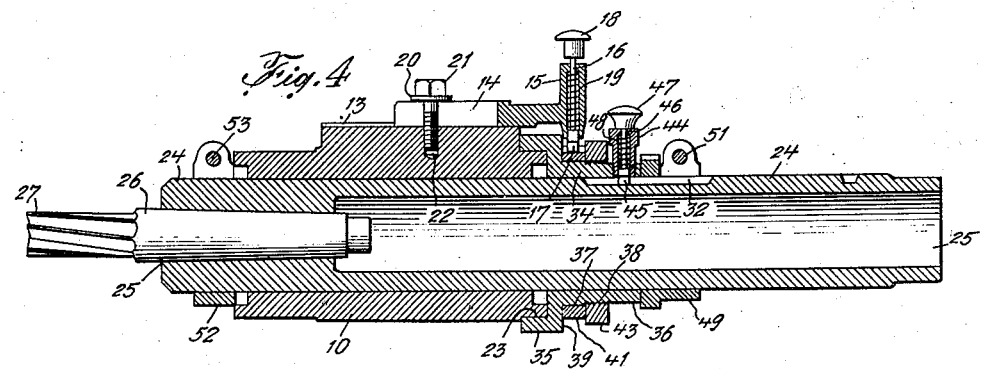
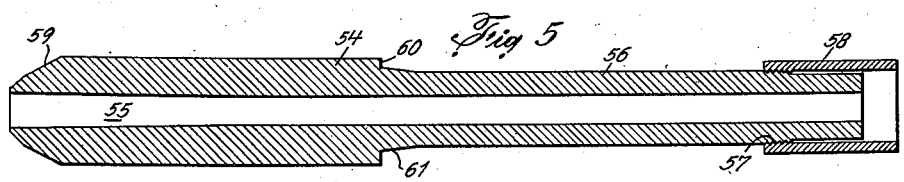
INVENTOR.
Ruben A. Franzen
BY Benjamin Webster
Attorney

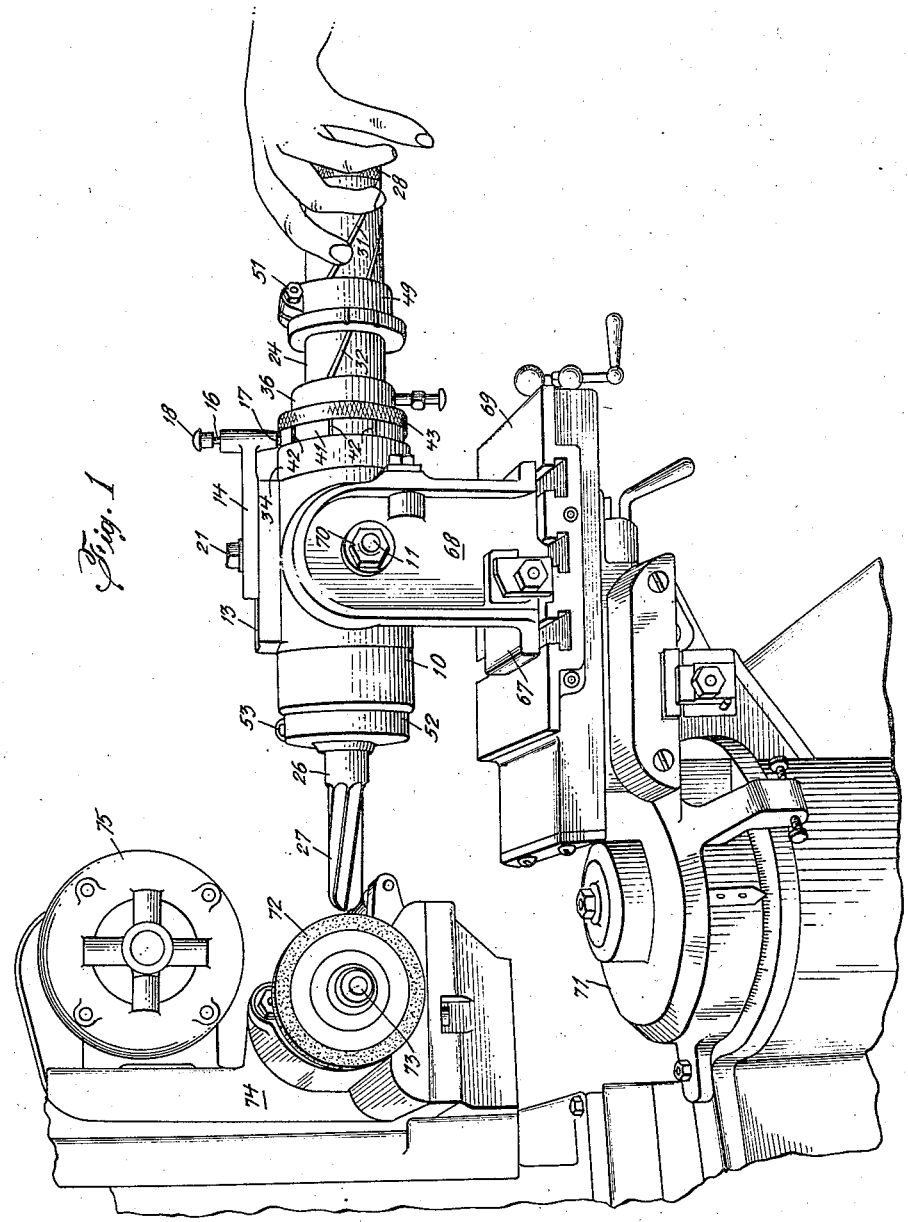

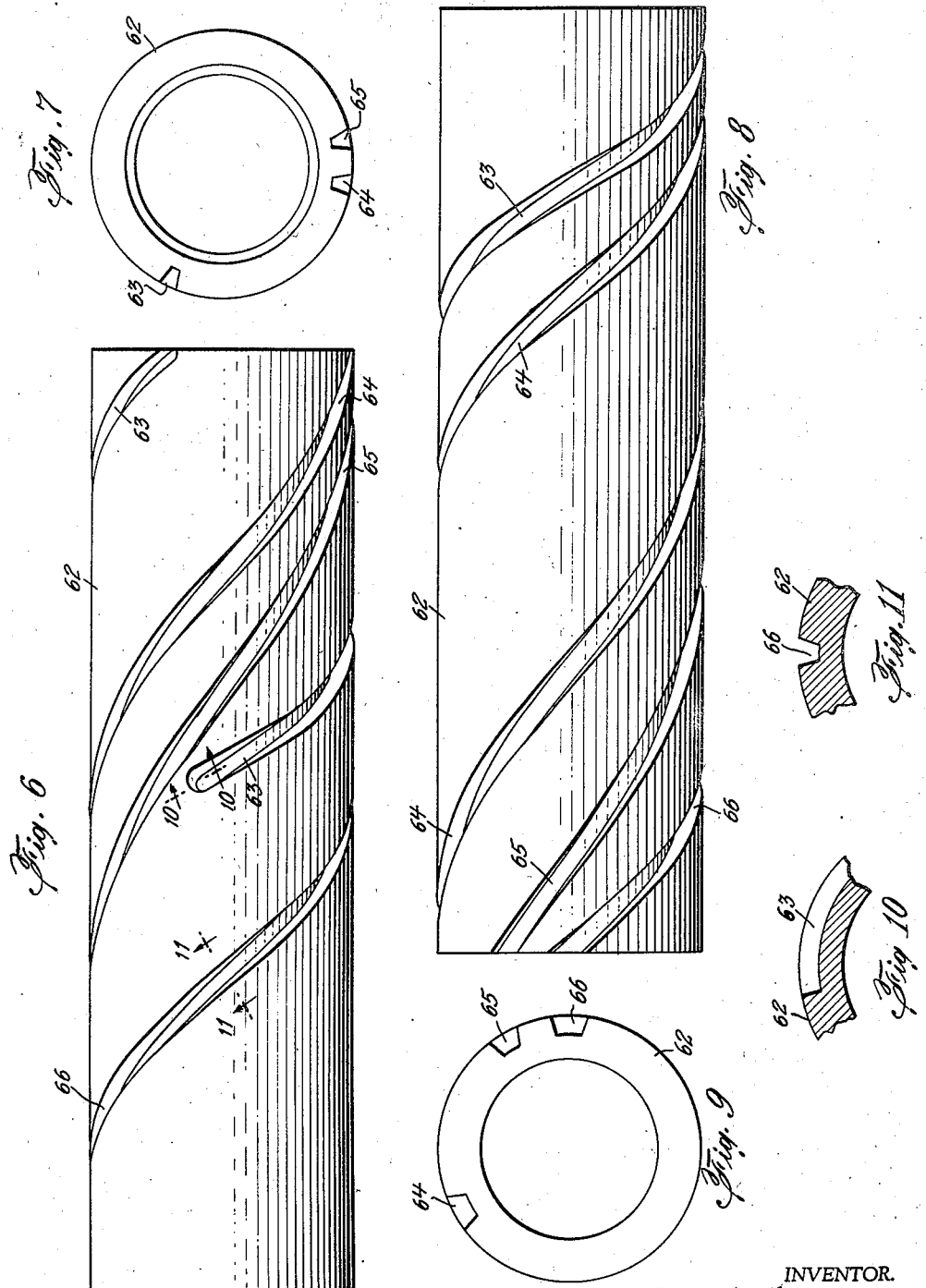

Patented Oct. 26, 1943

2,332,510

UNITED STATES PATENT OFFICE 2,332,510

CUTTER GRINDER

Ruben A. Franzen, Brooklyn, N. Y., assignor to Mechanical Die and Tool Company, Inc., Brooklyn, N. Y., a corporation of New York Application May 28, 1940, Serial No. 337,598

10 Claims. (Cl. 51—225)

This invention relates to mechanism for supporting, moving and feeding a concentric cutter for a milling machine, or a plurality of such cutters of different sizes but one at a time, with reference to a rotary grinding wheel for sharpening the cutter.

Among the objects of the invention are: to provide such a mechanism: that can grind concentric cutters to a precision of plus or minus 0.0002 inch in a fraction of the time required when using the customary equipment now known in the art; that grinds all cutter teeth to an equal height and thickness and distributes the grinding evenly over the full complement of teeth; that comprises few parts; that is quickly and facilely assembled or disassembled; that is easily, quickly and precisely controlled by the machinist; that has strong and durable parts; that grinds concentric cutters of all diameters; that makes possible a rapid feed of the cutter to the grinder; that produces a perfect finish of the ground cutter; that enables the cutter to take cuts of as little as 0.0005 inch stock using the full length of the cutter; that sharpens a cutter with such precision that each tooth does its proper and full share of work with the result that cutter breakage is substantially reduced; that permits cutters to be reground from the full original diameter again and again until the cutter is too tiny in diameter for any further use; that permits old cutters that have been discarded because of wear, lack of chip clearance, improper grinding, warpage in hardening or other causes, to be ground to smaller diameters and made equal to or better than new; that permits chip clearance to be reground as needed thereby maintaining 100% efficiency thruout the entire life of the cutter; that permits regular or special cutters to be ground from the solid after hardening thereby eliminating hardening distortion entirely; that greatly enhances the useful life of a concentric cutter; that permits the production of concentric cutters that are exact duplicates, which reduces the power consumption in using the cutter, and which reduces the wear of the spindle bearings of the cutting machine because the load is even with a resulting long life for the cutting machine and the maintenance of accuracy and precision over long periods of machine operation.

Reference is made to the drawings in which

Figure 1 is a perspective of the improved mechanism in an operative position with reference to a grinding wheel.

Figure 2 is a top view of the improved mechanism.

Figure 3 is a side view.

Figure 4 is a section on the line 4—4 of Figure 2.

Figure 5 is a lengthwise central section of a modified form of spindle.

Figure 6 is a top view of a sleeve enlarged but adapted to be used on the modified spindle shown in Figure 5 and having four grooves with leads differing from those shown in Figures 2 and 3 and from each other.

Figure 7 is a right end view of the cylindrical sleeve shown in Figure 6.

Figure 8 is a bottom view of Figure 6.

Figure 9 is a left end view of the sleeve shown in Figure 8.

Figure 10 is a section taken on the line 10—10 of Figure 6.

Figure 11 is a section taken on the line 11—11 of Figure 6.

A spindle bearing 10 is of general cylindrical form and has a lengthwise cylindrical bore; a shaft 11 projecting laterally substantially at the center for tiltably mounting the housing; a disk 12 concentric with the shaft 11, flat surfaced on the outside, and having on its periphery a graduated circle with "0" on top in the horizontal position of the bearing 10; and a groove 13 running lengthwise in the top of the bearing. An arm 14, having a central lengthwise slot, has a slidable fit in the groove, extends to the right over the end of the bearing, and has an upright housing 15 mounted on the end, in which a small spindle 16 is reciprocable and mounts at the bottom a pin 17, the latter extending below the housing 15. Lifting a stud 18 on top of the spindle 16 raises the pin 17 against a coil spring 19 which normally tends to hold the pin 17 in the protracted position. A washer 20 overlies opposite walls of the slot in the arm 14, and is engaged by a headed screw 21 which enters a screwhole 22 at the top of the bearing centrally of the groove for locking the arm 14 in any lengthwise adjustment. From the right end of the bearing there extends an annular shelf 23 of smaller diameter than the bearing itself. A spindle 24 is rotatable in the bore of the bearing 10 and is formed with an axial bore 25 reduced at the left end to receive and to mount a concentric cutter 26 which has a plurality of equidistant helical teeth 27. The right end 28 of the spindle 24 is externally knurled to provide a grip for manual rotation of the spindle.

Helical grooves of different lead or pitch, 29, 31, 32, and 33 are formed in the surface of the spindle 24. The four grooves shown have the following leads: an 11 inch lead for a ¾ inch cutter;

a 15.625 lead for a 1.000 cutter; a 22.930 inch lead for a 1½ inch cutter; and an 18.750 inch lead for a 1¼ inch cutter.

A locking ring assembly 34 terminates at the left end in an annular flange 35 fitting over and turnable on the shelf 23 and of greater diameter than a cylindrical body 36 of the assembly which has a cylindrical bore fitting over the spindle 24. The outside of the body 36 has an external annular cylindrical portion 37 at the right of which are threads 38 and at the left of which is a vertical wall 39 forming the right end of the flange 39. A ring 41 has an inner cylindrical surface fitting the portion 37 and turnable thereon, and in the outer wall a series of lengthwise grooves or notches 42 which are spaced in proportion to the spacing of the cutter teeth 27, and are engageable with the yieldable pin 17, which is set in any of the grooves by lifting the stud 18 and turning the ring 41. A locking ring 43 is internally threaded to engage the threads 38 and externally knurled for facile turning to engage the ring 41 and lock it in any rotatable position against the wall 39. A housing 44 rotatably mounts a pin 45 on a small spindle 46 at the top of which is a lifting stud 47. A coil spring 48 surrounds the spindle 46 and normally tends to hold the pin 45 in the selected helical groove 32. Adjustable stops are provided by the split ring 47 which has a locking bolt 51, at the right of the bearing 10 and split ring 52 which has a locking screw 53, at the left of the bearing 10.

In Figure 5 is shown a modified spindle 54, having an axial bore 55, the left end of which is adapted to receive and mount a concentric cutter 26, and having at the right a reduced portion 56 on which is fitted a cylindrical grooved sleeve 62, shown enlarged in Figures 6 and 8. A threaded band 57 near the outer end of portion 56 engages the threads of a collar 58 which removably secures a sleeve 62 on the spindle 54 and permits facile substitution of a variety of sleeves which have grooves with different leads. At the left end is a beveled nose 59 and at the center a perpendicular wall 60 adjoining an annular inclined surface 61.

Referring to Figures 6 to 11, inclusive, a cylindrical sleeve 62 is adapted to fit on the reduced portion 56 of the spindle 54 shown in Figure 5, and having four helical grooves 63, 64, 65, and 66 in which the pin 45 fits. The four grooves shown have the following leads: a 5.581 inch lead for a ⅜ inch cutter; a 9.214 inch lead for a ⅝ inch cutter; a 7.601 inch lead for a ½ inch cutter; and a 3.889 inch lead for a ¼ inch cutter.

Referring to Figure 1, a slide 67 has a transverse upright plane-surfaced plate 68, which is centrally apertured to mount the shaft 11 and held thereon by a nut 70 and which is mounted on a grooved plate 69, the latter being mounted on but offset from a turn-table 71. A grinding wheel 72 is rotatably mounted with a shaft 73 on the support 74 which also mounts an electrical motor 75.

In operating the mechanism, the cutter 26 is positioned, the desired groove on the spindle 24 or sleeve 62 is selected and the locking ring pin 45 is dropped in the groove, the locking ring 43 is loosened and the spindle turned to the starting position with the leading edge of the first tooth 27 engaging the grinding wheel 72, and the locking ring 43 then tightened, the wheel 72 is moved to a position for the desired feed; the spindle 24 is grasped with the hand on the knurled end 28 and is moved with a rotary clockwise movement toward the left until an entire tooth is ground; the stud 18 is lifted to remove the pin 17 from the notch 42 and the spindle is rotated until the pin 17 engages the next notch 42 which positions the next tooth 27 of the cutter 26 at the grinder 72; the foregoing operations are repeated for each succeeding tooth with the pin 45 traveling the same helical groove repeatedly for all the teeth which assures that all the teeth are uniformly and equally ground. A quick, light repeated grinding of all the teeth has sharpened a concentric cutter 26 to a precision of plus or minus 0.0001 inch.

Having now disclosed my invention and realizing that, in view of my disclosure many changes in parts, substitution of parts, or omission of parts will readily occur to those skilled in the art, I do not limit myself to the exact structure disclosed herein.

I claim:

1. A mechanism for supporting, moving and feeding a concentric cutter for milling machines with reference to a grinder, comprising in combination, a spindle having a plurality of helical grooves of different lead or pitch thereon, an axial bore at one end for mounting a cutter axially of the spindle and means at the other end for feeding the spindle along its axis, a bearing for mounting the spindle for rotation about its axis, and a pin adapted to engage the grooves one at a time, yieldably held in a groove, mounted on the bearing, and means for adjustably positioning the pin mounting circumferentially about the axis of the spindle, said means comprising a ring rotatable in the bearing and having circumferentially spaced notches engageable by a pin, said last pin being yieldably held on the bearing.

2. A mechanism for supporting, moving and feeding a concentric cutter for milling machines with reference to a grinder, comprising in combination, a spindle having a plurality of helical grooves of different lead or pitch thereon but disposed in a geometrical cylinder concentric with the axis of the spindle, an axial bore at one end for mounting a cutter axially of the spindle and means at the other end for feeding the spindle along its axis, a bearing for mounting the spindle for rotation about its axis, and a pin adapted to engage the grooves one at a time, yieldably held in a groove and mounted on the bearing, and means for adjustably positioning the pin mounting circumferentially about the axis of the spindle, said means comprising a ring rotatable in the bearing and having circumferentially spaced notches engageable by a pin, said last pin being yieldably held on the bearing.

3. A mechanism for supporting, moving and feeding a concentric cutter for milling machines with reference to a grinder, comprising in combination, a spindle having a plurality of helical grooves of different lead or pitch thereon but disposed in a geometrical cylinder concentric with the axis of the spindle, an axial bore at one end for mounting a cutter axially of the spindle and means at the other end for feeding the spindle along its axis, a bearing for mounting the spindle for rotation about its axis, a pin adapted to engage the grooves one at a time, yieldably held in a groove and mounted on the bearing, and means for adjustably positioning the pin mounting circumferentially about the axis of the spindle, said means comprising a ring rotatable about the bearing and having circumferentially spaced notches engageable by a pin, said last pin being yieldably held on an arm that is mounted on the bearing for lengthwise adjustment.

4. A mechanism for supporting, moving and feeding a concentric cutter for milling machines with reference to a grinder, comprising in combination, a spindle having a plurality of helical grooves of different lead or pitch thereon but disposed in a geometrical cylinder concentric with the axis of the spindle, an axial bore at one end for mounting a cutter axially of the spindle and means at the other end for feeding the spindle along its axis, a bearing for mounting the spindle for rotation about its axis, a pin adapted to engage the grooves one at a time, yieldably held in a groove and mounted on the bearing, and means for adjustably positioning the pin mounting circumferentially about the axis of the spindle, said means comprising a ring rotatable about the bearing and having circumferentially spaced notches engageable by a pin, means for locking said ring against rotation, said last pin being yieldably mounted on the bearing.

5. A mechanism for supporting, moving and feeding a concentric cutter for milling machines with reference to a grinder, comprising in combination, a spindle having a helical groove thereon, means at one end for mounting the cutter axially of the spindle and means at the other end for feeding the spindle along its axis, a bearing for mounting the spindle for rotation about its axis, a pin adapted to engage the groove, and means for adjustably positioning the pin circumferentially about the axis of the spindle, comprising an annular member rotatable in the bearing, said pin being yieldably mounted therein, a ring rotatably mounted on said annular member, a locking ring for preventing rotation of said first ring on said annular member, and a member mounted on said bearing for adjustably engaging said first ring.

6. The construction defined in claim 5, together with said first ring being provided with circumferentially spaced notches and said last-named member being a pin yieldably mounted to removably engage said notches respectively.

7. The construction defined in claim 5, together with said spindle having a plurality of helical grooves of different lead or pitch thereon.

8. A mechanism for supporting, moving and feeding a concentric cutter for milling machines with reference to a grinder, comprising, in combination, a spindle, a cylindrical sleeve, a helical groove in the sleeve, means for removably locking the sleeve on the spindle, means at one end for mounting the cutter axially of the spindle and means at the other end for feeding the spindle along its axis, a bearing for mounting the spindle for rotation about its axis, a pin adapted to engage the groove, and means for adjustably positioning the pin circumferentially about the axis of the spindle, comprising an annular member rotatable with relation to the bearing, said pin being yieldably mounted therein, a ring rotatably mounted on said annular member, a locking ring for preventing rotation of said first ring on said annular member, and a member mounted on said bearing for adjustably engaging said first ring.

9. The construction defined in claim 8, together with said sleeve having a plurality of helical grooves of different lead or pitch thereon.

10. The construction defined in claim 5, together with said spindle being mounted for manual operation to rotate it on its axis and feed it along its axis.

RUBEN A. FRANZEN.